US012560224B2

(12) United States Patent

Bonham

(10) Patent No.: US 12,560,224 B2

(45) Date of Patent: Feb. 24, 2026

(54) CONTINUOUSLY VARIABLE TRANSMISSION WITH A SELECT REVOLUTIONS PER MINUTE OUTPUT

(71) Applicant: TEAM Industries, Inc., Bagley, MN (US)

(72) Inventor: Brandon R. Bonham, Bemidji, MN (US)

(73) Assignee: TEAM Industries, Inc., Bagley, MN (US)

( * ) Notice: Subject to any disclaimer, the term of this patent is extended or adjusted under 35 U.S.C. 154(b) by 0 days.

(21) Appl. No.: 18/778,228

(22) Filed: Jul. 19, 2024

(65) Prior Publication Data

US 2025/0027553 A1 Jan. 23, 2025

Related U.S. Application Data

(60) Provisional application No. 63/514,474, filed on Jul. 19, 2023.

(51) Int. Cl.
*F16H 9/18* (2006.01)
*F16H 59/40* (2006.01)
(Continued)

(52) U.S. Cl.
CPC .............. *F16H 9/18* (2013.01); *F16H 59/40* (2013.01); *F16H 59/42* (2013.01); *F16H 61/66227* (2013.01)

(58) Field of Classification Search
CPC ... B60K 6/543; F16H 9/18; F16H 9/16; F16H 59/40; F16H 59/42; F16H 55/563; F16H 63/067; F16H 61/66227
(Continued)

(56) References Cited

U.S. PATENT DOCUMENTS 2,678,566 A * 5/1954 Oehrli ............... F16H 61/66227
474/15
2,715,842 A * 8/1955 Homuth ............ F16H 61/66245
474/15
(Continued)

FOREIGN PATENT DOCUMENTS

DE 102017108458 A1 11/2017
WO 2021075239 A1 4/2021

OTHER PUBLICATIONS

International Searching Authority, "International Search Report and Written Opinion", dated Oct. 25, 2024, from PCT Application No. PCT/US2024/038746, from Foreign Counterpart to U.S. Appl. No. 18/778,228, pp. 1 through 16, Published: WO.

*Primary Examiner* — Henry Y Liu
(74) *Attorney, Agent, or Firm* — Fogg & Powers LLC

(57) ABSTRACT

A CVT with a constant RPM output is provided. An input clutch of the CVT is in operational communication with a motor. An output clutch is in operational communication with the input clutch via an endlessly looped member. An output fixed sheave is axially fixed on an output post of the output clutch. An output movable sheave of the output clutch is axially slidable on the output post. An output actuator is configured to move the output movable sheave in relation to the output fixed sheave in response to a change in at least one of a torque input and an RPM input that is delivered to the output clutch via the endless looped member to maintain a constant RPM output of the output clutch at a select RPM. The output clutch is configured to be coupled to a rotational input operating device that requires the select RPM for operation.

14 Claims, 7 Drawing Sheets

(51) Int. Cl.
  *F16H 59/42* (2006.01)
  *F16H 61/662* (2006.01)
(58) Field of Classification Search
  USPC .......................................... 474/11, 13, 14, 15
  See application file for complete search history.

(56) References Cited

U.S. PATENT DOCUMENTS

| | | | | |
|---|---|---|---|---|
| 3,280,648 A * | 10/1966 | Nelson | F16H 61/66245 | |
| | | | 474/14 | |
| 3,491,609 A * | 1/1970 | Henriksen | G03B 19/18 | |
| | | | 474/15 | |
| 3,659,470 A * | 5/1972 | Beaudoin | F16H 61/66245 | |
| | | | 474/13 | |
| 3,733,918 A * | 5/1973 | Domaas | F16H 55/563 | |
| | | | 474/14 | |
| 4,575,363 A * | 3/1986 | Burgess | F16H 55/563 | |
| | | | 474/14 | |
| 4,991,400 A * | 2/1991 | Wilkinson | F25B 27/00 | |
| | | | 62/323.3 | |
| 5,049,112 A * | 9/1991 | Gunsing | F16D 43/284 | |
| | | | 474/18 | |
| 5,584,371 A * | 12/1996 | Kelledes | F16D 35/024 | |
| | | | 192/82 T | |
| 5,846,155 A * | 12/1998 | Taniguchi | B60L 58/13 | |
| | | | 903/910 | |
| 6,149,540 A * | 11/2000 | Johnson | F16H 61/66227 | |
| | | | 474/46 | |
| 6,290,620 B1 * | 9/2001 | Tsai | F16H 61/66272 | |
| | | | 474/18 | |
| 6,406,390 B1 * | 6/2002 | Roby | F16H 55/563 | |
| | | | 474/14 | |
| 6,682,451 B1 * | 1/2004 | Luh | F16H 61/66259 | |
| | | | 474/18 | |
| 6,962,543 B2 * | 11/2005 | Roby | F16H 63/067 | |
| | | | 474/37 | |
| 7,217,204 B2 * | 5/2007 | Roby | F16H 55/56 | |
| | | | 474/46 | |
| 7,313,977 B2 * | 1/2008 | Borghi | F16H 55/563 | |
| | | | 74/13 | |
| 7,798,930 B2 * | 9/2010 | Nojiri | F16H 55/56 | |
| | | | 123/48 B | |
| 8,267,835 B2 * | 9/2012 | Raasch | F02D 29/06 | |
| | | | 477/44 | |
| 8,425,207 B2 * | 4/2013 | Lee | F04B 35/04 | |
| | | | 417/362 | |
| 8,512,203 B2 * | 8/2013 | Raasch | F02D 29/06 | |
| | | | 477/44 | |
| 8,534,413 B2 * | 9/2013 | Nelson | B60W 30/1882 | |
| | | | 474/8 | |
| 8,684,887 B2 * | 4/2014 | Krosschell | F16H 61/66259 | |
| | | | 477/44 | |
| 8,714,116 B2 * | 5/2014 | Hartman | F01P 7/026 | |
| | | | 123/41.11 | |
| 8,810,057 B2 * | 8/2014 | Krietzman | F03D 9/12 | |
| | | | 290/55 | |
| 8,845,486 B2 * | 9/2014 | Raasch | B60W 10/06 | |
| | | | 477/44 | |
| 9,181,850 B2 * | 11/2015 | Roby | F01P 7/048 | |
| 9,353,673 B2 * | 5/2016 | Ge | F04D 27/004 | |
| 9,518,641 B2 * | 12/2016 | Mariotti | F16H 55/563 | |
| 9,628,009 B2 * | 4/2017 | Koenen | H02P 9/04 | |
| 9,759,313 B2 * | 9/2017 | Nelson | F16H 61/0204 | |
| 9,816,487 B2 * | 11/2017 | Govind | F03D 80/88 | |
| 9,890,638 B2 * | 2/2018 | Baker, Jr. | F01B 21/02 | |
| 10,066,710 B2 * | 9/2018 | Barendrecht | F16H 63/067 | |
| 10,774,907 B2 * | 9/2020 | Kernbaum | F16H 9/04 | |
| 11,193,583 B2 * | 12/2021 | Bradley | F16H 61/66236 | |
| 11,543,005 B2 * | 1/2023 | Zurbruegg | F16H 9/18 | |
| 11,549,585 B2 * | 1/2023 | Bradley | F16H 61/66 | |
| 11,592,100 B2 * | 2/2023 | Bonham | F16H 55/56 | |
| 2002/0022542 A1 * | 2/2002 | Pfleger | F16H 61/66272 | |
| | | | 475/45 | |
| 2002/0155909 A1 * | 10/2002 | Roby | F16H 55/56 | |
| | | | 474/46 | |
| 2005/0153805 A1 * | 7/2005 | Koyama | F16H 61/66272 | |
| | | | 474/18 | |
| 2006/0019781 A1 * | 1/2006 | Roby | F16H 55/563 | |
| | | | 474/8 | |
| 2007/0265761 A1 * | 11/2007 | Dooley | F02C 7/32 | |
| | | | 701/100 | |
| 2008/0085800 A1 * | 4/2008 | Nojiri | F16H 55/56 | |
| | | | 474/153 | |
| 2009/0017958 A1 * | 1/2009 | Kurihara | F16H 37/0846 | |
| | | | 475/210 | |
| 2009/0236860 A1 * | 9/2009 | Raasch | F02D 29/06 | |
| | | | 290/40 B | |
| 2010/0308586 A1 * | 12/2010 | Frank | F03D 7/0224 | |
| | | | 290/44 | |
| 2010/0311529 A1 * | 12/2010 | Ochab | F16D 43/18 | |
| | | | 474/11 | |
| 2011/0092324 A1 * | 4/2011 | Roby | F16H 55/56 | |
| | | | 474/8 | |
| 2012/0076676 A1 * | 3/2012 | Lee | F04B 49/103 | |
| | | | 417/362 | |
| 2012/0288377 A1 * | 11/2012 | Hartman | F01P 7/026 | |
| | | | 417/13 | |
| 2012/0328454 A1 * | 12/2012 | Roby | F01P 7/046 | |
| | | | 474/8 | |
| 2013/0092468 A1 * | 4/2013 | Nelson | B60W 10/107 | |
| | | | 474/43 | |
| 2013/0096793 A1 * | 4/2013 | Krosschell | F16H 63/067 | |
| | | | 701/68 | |
| 2014/0277976 A1 * | 9/2014 | Mitsuyasu | F16H 63/46 | |
| | | | 701/67 | |
| 2014/0315670 A1 * | 10/2014 | Mariotti | F16H 55/563 | |
| | | | 474/12 | |
| 2015/0024882 A1 * | 1/2015 | Ochab | F16H 63/067 | |
| | | | 474/19 | |
| 2015/0122557 A1 * | 5/2015 | Fairhead | B62D 11/105 | |
| | | | 180/6.7 | |
| 2016/0146335 A1 * | 5/2016 | McGuire | F16H 61/702 | |
| | | | 701/51 | |
| 2016/0168995 A1 * | 6/2016 | Baker Jr. | F04B 9/02 | |
| | | | 92/61 | |
| 2016/0201652 A1 * | 7/2016 | Govind | F03D 1/0658 | |
| | | | 416/210 A | |
| 2018/0301239 A1 * | 10/2018 | Murao | H01B 7/02 | |
| 2018/0320766 A1 * | 11/2018 | Kernbaum | F16H 55/563 | |
| 2019/0136835 A1 * | 5/2019 | Boeing | F03D 9/255 | |
| 2020/0278025 A1 * | 9/2020 | Bradley | F16H 61/66236 | |
| 2022/0090676 A1 * | 3/2022 | Bradley | B60W 10/06 | |
| 2022/0196087 A1 * | 6/2022 | Young | F16D 43/06 | |
| 2022/0243810 A1 * | 8/2022 | Truskolaski | F16H 63/062 | |
| 2023/0124772 A1 * | 4/2023 | Lasko | F16H 63/067 | |
| | | | 474/13 | |
| 2023/0160442 A1 * | 5/2023 | Van Metre | F16H 55/563 | |
| | | | 384/623 | |
| 2023/0272827 A1 * | 8/2023 | Young | F16D 43/06 | |
| | | | 192/103 A | |

* cited by examiner

COUPLE VARYING ENGINE TORQUE TO PRIMARY CLUTCH 602

GENERATE CONSTANT RPM OUTPUT FROM OUTPUT CLUTCH 604

OPERATE ROTATIONAL INPUT OPERATED DEVICE WITH CONSTANT RPM OUTPUT FROM THE CVT 606

600

CONTINUOUSLY VARIABLE TRANSMISSION WITH A SELECT REVOLUTIONS PER MINUTE OUTPUT

CROSS-REFERENCE TO RELATED APPLICATIONS

This Application claims priority to U.S. Provisional Application Ser. No. 63/514,474, same title herewith, filed on Jul. 19, 2023, which is incorporated in its entirety herein by reference.

BACKGROUND

Various devices require a rotational input for operation. Example devices that require a rotational input for operation include hydraulic pumps, electrical alternators, wind turbines, energy storage flywheels, etc. With some devices and in some applications, a rotational input with constant revolutions per minute (RPM) is desired for the device operation.

Continuously variable transmissions (CVTs) provide advantages over traditional transmission due to infinite gearing ratios that a can CVT provide. Moreover, CVTs are capable of delivering a wide gear ratio range from a single device. This enables a vehicle engine to operate at peak efficiency or peak power at a wide range of vehicle speeds.

A CVT typically includes a primary clutch and a secondary clutch. The primary clutch may also be referred to as a primary pulley, a drive clutch, or a drive sheave. The secondary clutch may also be referred to as a secondary pulley, a driven clutch, or driven sheave. The primary clutch is typically in operational communication with an engine/motor to receive engine torque and the secondary clutch is in operational communication with a driveline of an associated vehicle.

The secondary clutch is in rotational communication with the primary clutch via endless loop member such as a belt. Both the primary clutch and secondary clutch may include a movable sheave that is configured move axially on a post and a fixed sheave that is axially fixed at a position on the post. The movable sheave axially moves on the post either away from or towards the fixed sheave based on revolutions per minute (RPM) or applied torque the associated CVT clutch is experiencing.

For the reasons stated above and for other reasons stated below which will become apparent to those skilled in the art upon reading and understanding the present specification, there is a need in the art for an effective and efficient system to generate a constant rotational output having at a select RPM.

SUMMARY

The following summary is made by way of example and not by way of limitation. It is merely provided to aid the reader in understanding some of the aspects of the subject matter described. Embodiments provide a CVT that provides a rotational output at a set RPM that is used to run a rotational input operated device.

In one embodiment, a CVT with a constant RPM output is provided. The CVT includes an input clutch, an endlessly looped member and an output clutch. The input clutch is in operational communication with a motor. The output clutch is in operational communication with the input clutch via the endlessly looped member. The output clutch includes an output post, an output fixed sheave, an output movable sheave, and an output actuator. The output fixed sheave is axially fixed on the output post. The output movable sheave is axially slidable on the output post. The output actuator is configured to move the output movable sheave in relation to the output fixed sheave in response to a change in at least one of a torque input and RPM input that is delivered to the output clutch via the endless looped member to maintain a constant RPM output of the output clutch at a select RPM. The output clutch is configured to be coupled to a rotational input operating device that requires the select RPM for operation.

In another embodiment, a power delivery system is provided. The power delivery system includes a motor, a CVT, and a rotational input operated device. The motor is configured to generate engine torque. The CVT has a constant RPM output. The CVT includes an input clutch, and endlessly looped member and an output clutch. The input clutch is in operational communication with the motor to receive the engine torque generated by the motor. The output clutch is in operational communication with the input clutch via the endlessly looped member. The output clutch includes an output post, an output fixed sheave, an output movable sheave, and an output actuator. The output fixed sheave is axially fixed on the output post. The output movable sheave is axially slidable on the output post. The output actuator is configured to move the output movable sheave in relation to the fixed sheave on the output post in response to a change in at least one of an input torque and an input RPM that is delivered to the output clutch via the endless looped member to maintain a constant RPM output of the output clutch at a select output RPM. The rotational input operated device is in operational communication to receive the constant RPM output of the output clutch at the selected RPM.

In yet another embodiment, a method of calibrating an output clutch of a CVT to produce a constant RPM output at a select RPM for inputs in an input range is provided. The method including applying at least one of torque inputs and RPM inputs across the input range to an output clutch of the CVT, monitoring an RPM output of the output clutch throughout the input range of the at least one of the torque inputs and the RPM inputs; and when the monitored RPM output of the output clutch does not provide a desired constant RPM output at the select RPM throughout the input range, switching at least one of current rollers used to move an output movable sheave of the output clutch with replacement rollers having a different mass and current ramps with replacement ramps having different slopes until the desired constant RPM output at the select RPM is achieved.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and which are shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

The term "coupled" as described herein includes components that are directly coupled to react with each other as well as components that react with each other through one or more intermediate components. Further, such terms as "operational communication" and "operationally coupled" used herein include components that are directly coupled to react with each other and components that react to each other through one or more intermediate components.

Figure 1A:
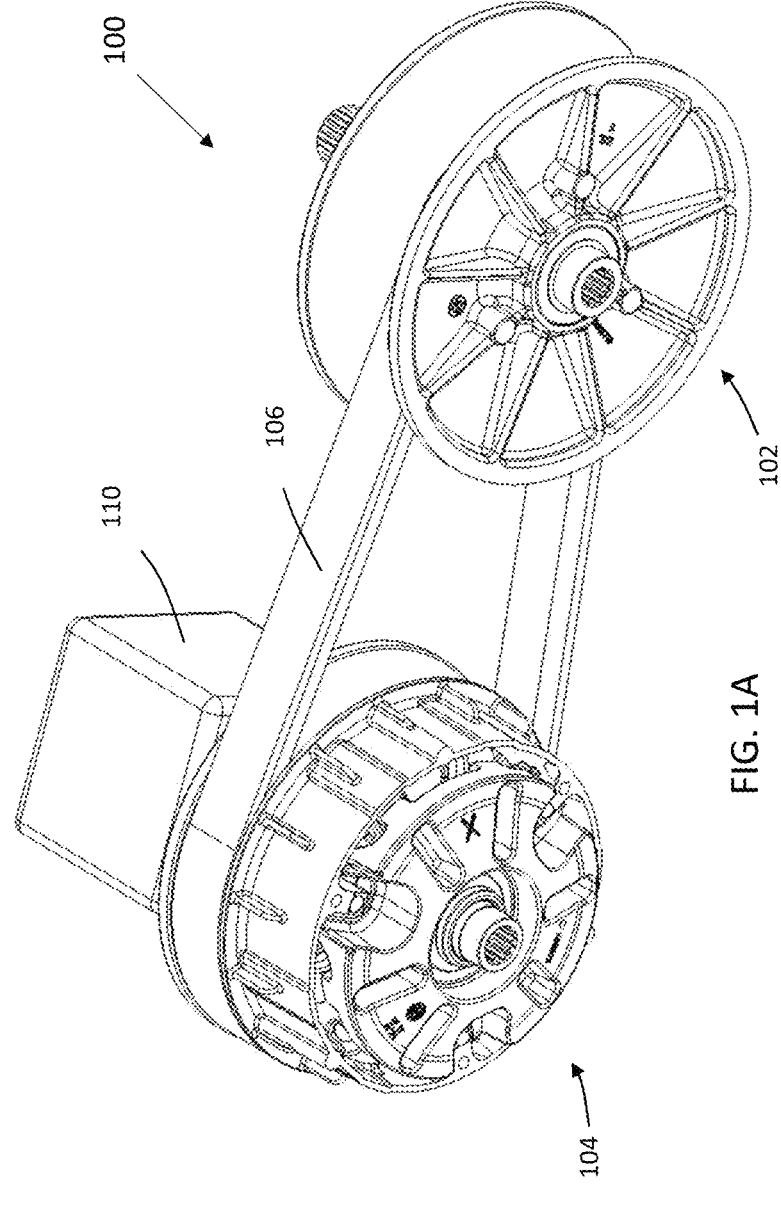
FIG. 1A is a side perspective view of a CVT providing a select RPM output in a first configuration according to an example aspect of the preset invention.

Embodiments provide a continuously variable transmission (CVT) 100 configured to provide a constant revolutions per minute (RPM) output to a rotational input operated device 110. The transmission is a CVT in embodiments that includes a primary clutch and a secondary clutch. The primary clutch is referred to as an input clutch 102 and the secondary clutch is referred to as an output clutch 104 in examples herein. Input clutch 102 is in operational communication with an engine/motor (as illustrated below in FIG. 3. Output clutch 104 is in operational communication with a rotational input operated device 110. The input clutch 102 and the output clutch 104 are in operational communication with each other via an endless looped member, such as, but not limited to a belt 106 in an example. An example of CVT 100 is illustrated in FIG. 1A. In particular, FIG. 1A illustrates a side perspective view of CVT 100 and the rotation input operated device 110.

Figure 1B:
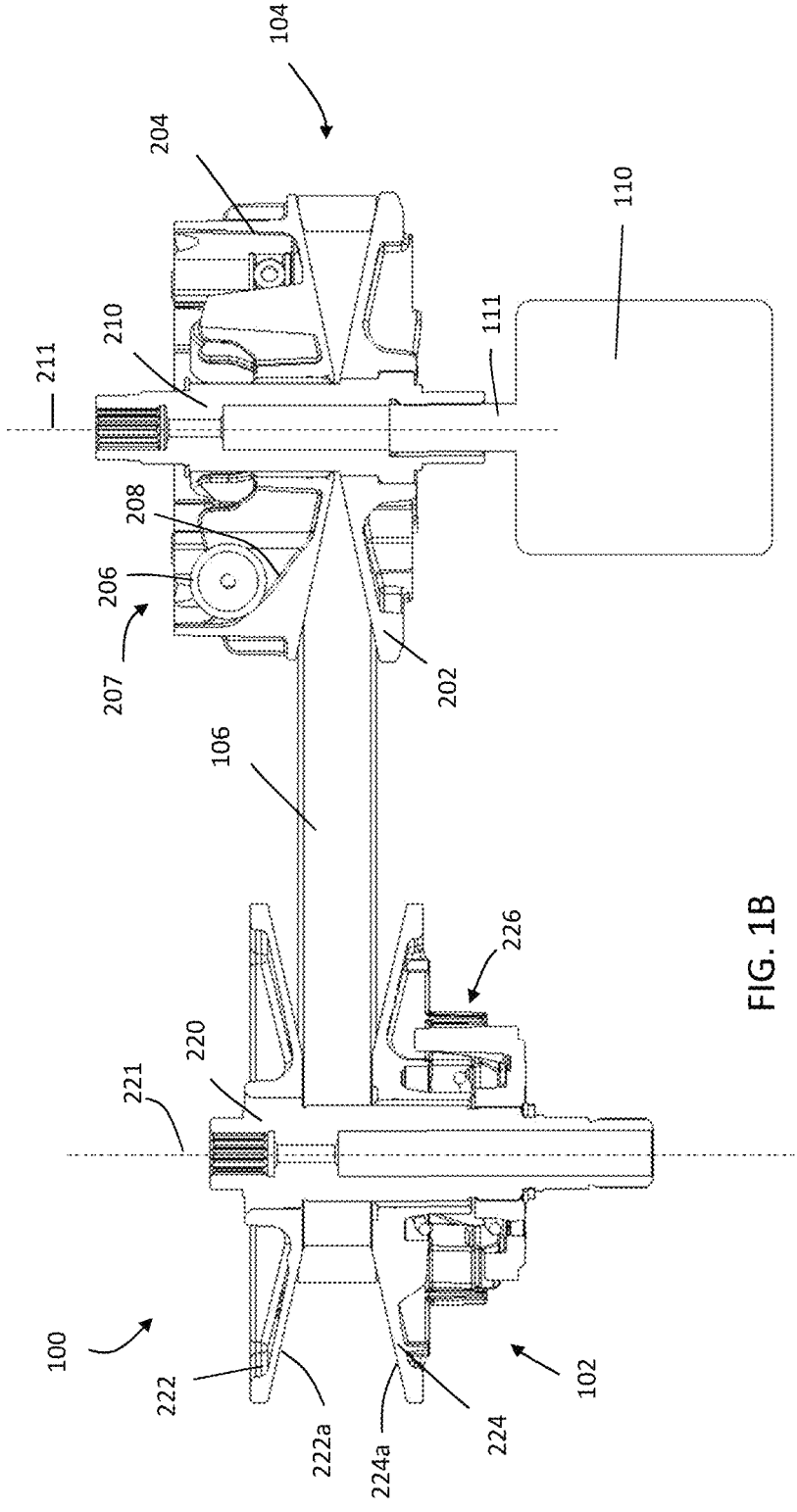
FIG. 1B is a cross-sectional top view of the CVT providing a select RPM output of FIG. 1A in a first configuration.

FIG. 1B illustrates a top view of CVT 100 and rotational input operated device 110. The input clutch 102 includes an input post 220. An input fixed sheave 222 is axially fixed on an end of input post 220. An input movable sheave 224 is slidably mounted on the input post 220. At least portion of the input movable sheave 224 selectively moves axially on the input post 220 to move a movable engagement face 224a of the input movable sheave 224 towards or away from a fixed engagement face 222a of the input fixed sheave 222. This action moves the belt 106 towards or away from an input central axis 221 of the input clutch 102. The position of belt 106 in relation to the input central axis 221 sets the gearing ratio of the input clutch 102. An input clutch actuator 226 is used to selectively and axially move the input movable sheave 224 on the input post 220 in this example. The input clutch actuator 226, for example, may be a torque sensitive actuator assembly, an RPM sensitive actuator assembly, or simply a belt tensioner assembly. Input clutch activator 226 of FIG. 1B includes a biasing spring 228 (best illustrated in FIG. 2B) that exerts a positive force on belt 106 and a cam feature 225 (also best illustrated in FIG. 2B) that reacts against three buttons (not shown) that are attached to the input movable sheave 224.

The output clutch 104, illustrated in FIG. 1B, includes an output fixed sheave 202 and an output movable sheave 204. The output fixed sheave 202 is axially fixed at a set location on an output post 210. The output movable sheave 204 is at least in part slidably mounted on output post 210. Output movable sheave 204 includes an output clutch actuator 207 that is configured to move the output moveable sheave 204 towards or away from the output fixed sheave 202. This action moves belt 106 towards or away from the output central axis 211. The position of belt 106 (endless looped member) in relation to output central axis 211 sets the gearing ratio of the output clutch 104. The output clutch activator 207, in this example, includes rollers 206 that engage ramp surfaces of ramps 208. Rollers 206 move up and down on associated ramp surfaces due to centrifugal forces caused by the rotation of the output clutch 104 in this example. Ramps 208 are coupled to a housing 209 of the output movable sheave 204. In one example, ramps 208 are replaceable (i.c., can be removed from housing 209 and replaced). The output clutch activator 207 in this example, further includes a spider 215 that is axially fixed to output post 210. Each roller 206 is coupled to an arm of the spider 215.

Other types of movable sheave actuators activated by the RPMs the output clutch is experiencing may be used in other examples of the output clutch of the CVT 100. The output clutch activator 207 is configured to position the belt 106 in relation to the output central axis 211 to maintain a desired RPM for the output clutch 102 as long as the motor is providing engine torque. The rotational input operated device 110 is coupled to the output post 210 of output clutch 104 to couple rotation of the output post 210 of the output clutch 104 to a rotational input 111 of the rotational input operated device 110.

Figure 3:
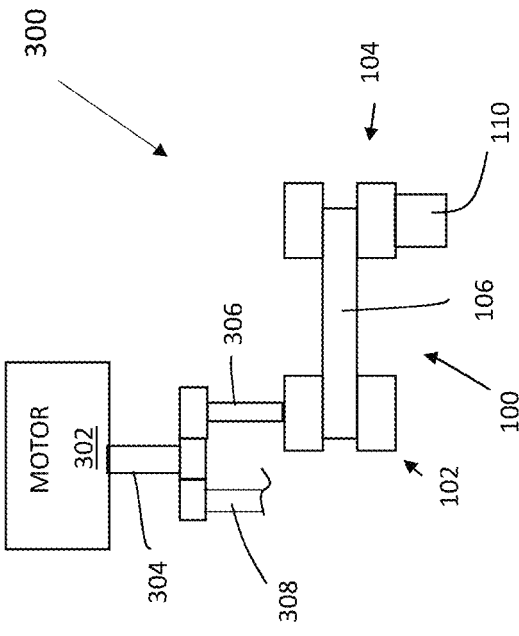
FIG. 3 is a block diagram of a power delivery system that includes a CVT providing a select RPM output according to an example aspect of the preset invention.

FIG. 3 illustrates a power delivery system 300 that provides an RPM output at a desired RPM. The power delivery system 300 includes a motor 302 that provides engine torque. Motor 302 may be any type of motor that is capable of providing engine torque including, but not limited to, internal combustion engines, electrical motors etc. An output of motor 302 is operationally communicated to the primary clutch 102. In the example of FIG. 3, the input clutch 102 of the CVT 100 is in operational communication with motor 302 via motor output shaft 304 (which may be a crank shaft) and primary input shaft 306. The power delivery system 300 may further have a secondary delivery member 308 that is used to provide torque to another system (for example, a driveline of a vehicle or another type of system that requires torque for operation, etc.). The input clutch 102 is operationally communicated with the output clutch 104 via an endless looped member such as belt 106. The rotational input operated device 110 is in operational communication with the output clutch 104. Examples of rotational input operated devices 110 include, but are not limited to, hydraulic pumps, electrical alternators, wind turbines, and energy storage flywheels.

Motor 302 may output a range of torques resulting in varying RPMs at the input clutch 102. The torque input into the CVT 100 may vary as needed by another system, discussed above, that is in operational communication with the secondary torque delivery member 308, or may vary based on a user input, or for yet another reason. Embodiments of the power deliver system 300 provides an RPM output to the rotational input operated device 110 at a constant desired RPM that is independent of a range of engine torque output by the motor 302. This is done with the configuration of CVT 100. In embodiments, the output clutch 104 of the CVT 100 is configured so the RPM output to the rotational input operated device 110 is constant at a select RPM, provided the motor 302 is generating engine torque to rotate the input clutch 102.

Figure 2A:
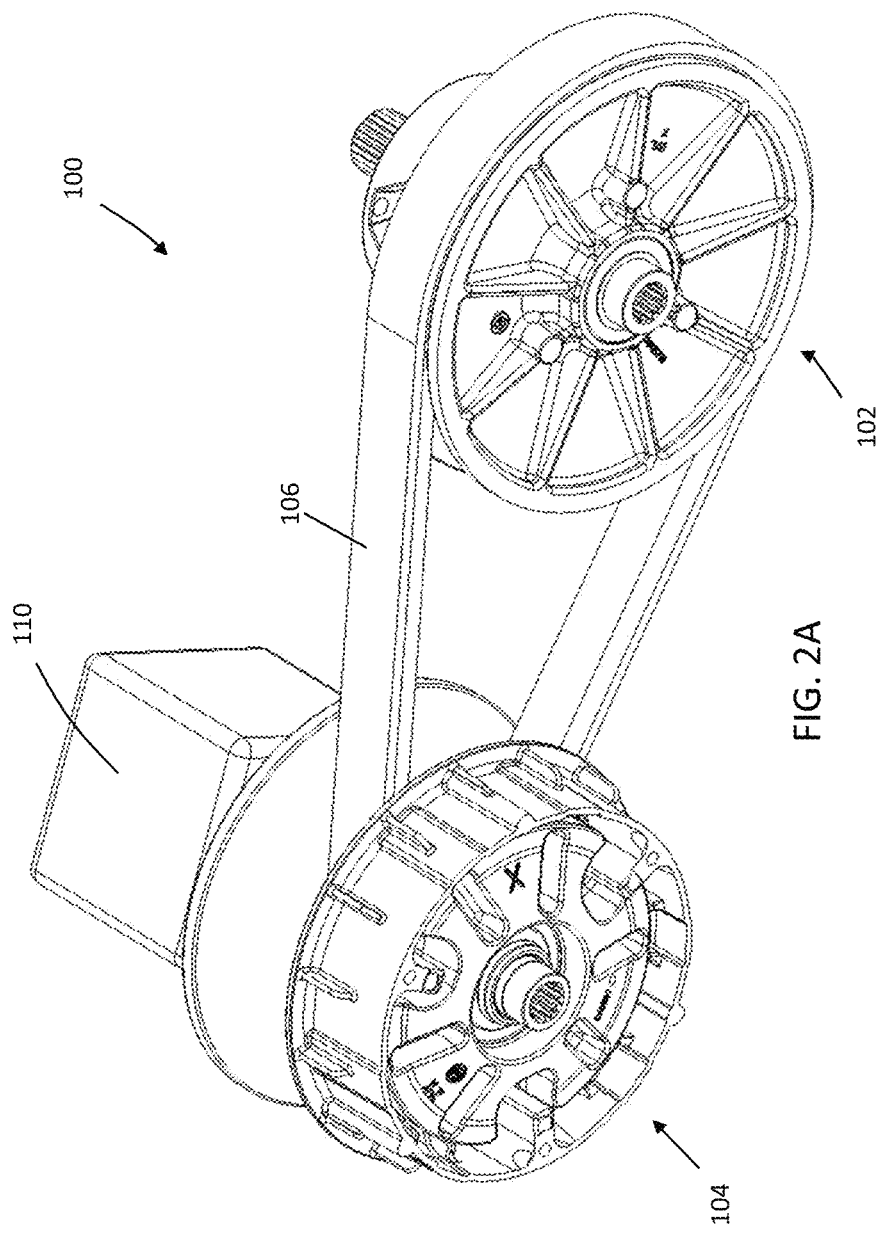
FIG. 2A is a side perspective view of the CVT providing a select RPM output of FIG. 1A in a second configuration.
Figure 2B:
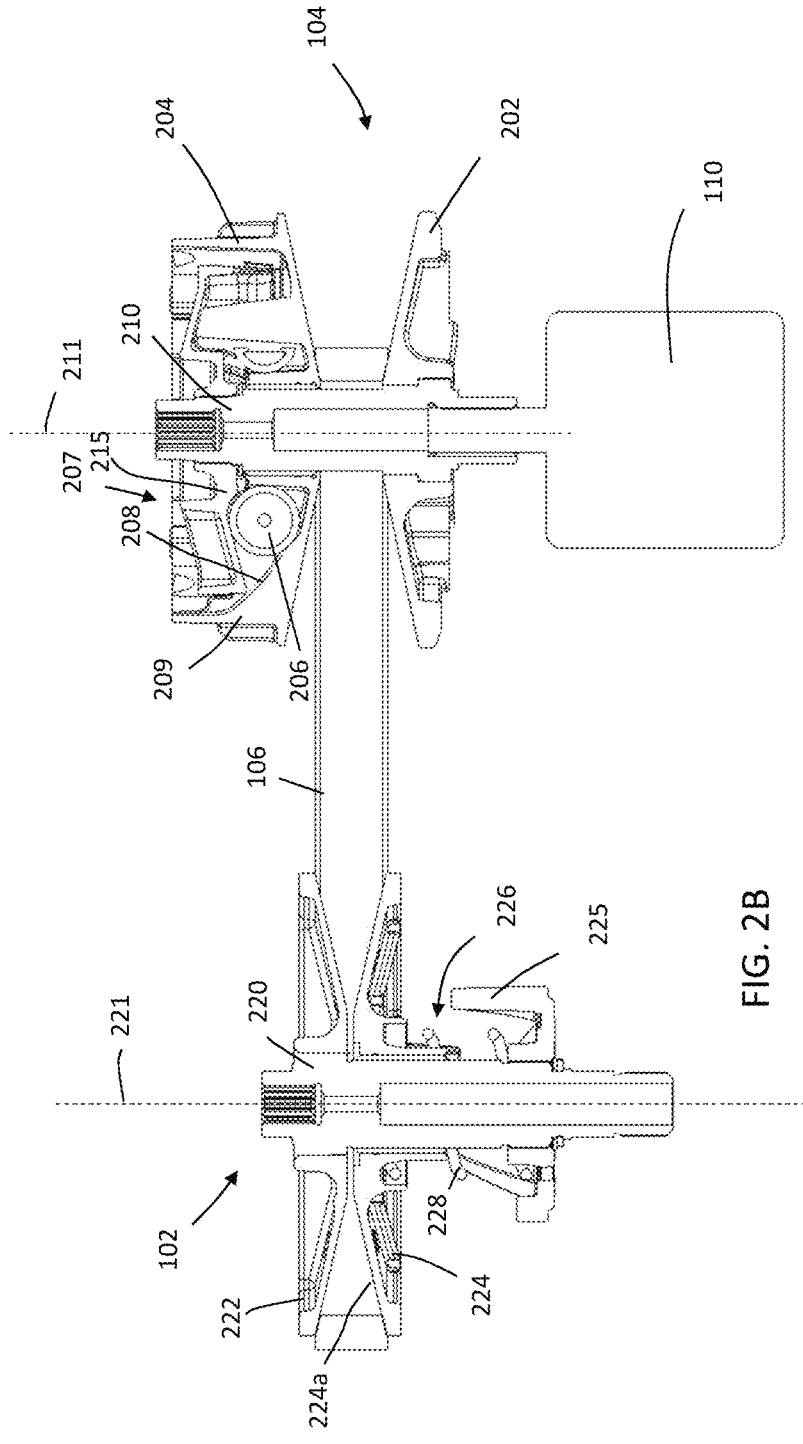
FIG. 2B is a cross-sectional top view of the CVT providing a select RPM output of FIG. 1A in the second configuration.

For example, FIG. 1A and 1B illustrate the belt 106 being positioned away from the output central axis 211 of the output clutch 104 while the belt 106 is positioned near the input central axis 221 of the input clutch 102 and FIGS. 2A and 2B illustrate the belt 106 positioned close to the output central axis 211 of the output clutch 104 while the belt 106 is positioned away from the input central axis 221 of the input clutch 102. These illustrated configurations show that the gearing ratio of the CVT changes with the change in engine torque output from motor 302 to achieve a constant RPM at the rotational input operated device 110.

For example, as the RPM increases at the output clutch 104, as a result of an increase in engine torque, the rollers 206 (centrifugal elements) move up associated ramps 208. The configuration of the output actuator 207 in the output clutch 104 of the CVT 100 effectively increases the running diameter of the belt 106 in the output clutch 104 when an increase in RPMs is applied to output clutch 104 via the belt 106. This reduces the effective ratio of the CVT 100 therein reducing the output RPM of the CVT 100 relative to the input RPM (from the engine torque) while maintaining a constant RPM for the rotational input operated device 110.

Figures 4, 5:
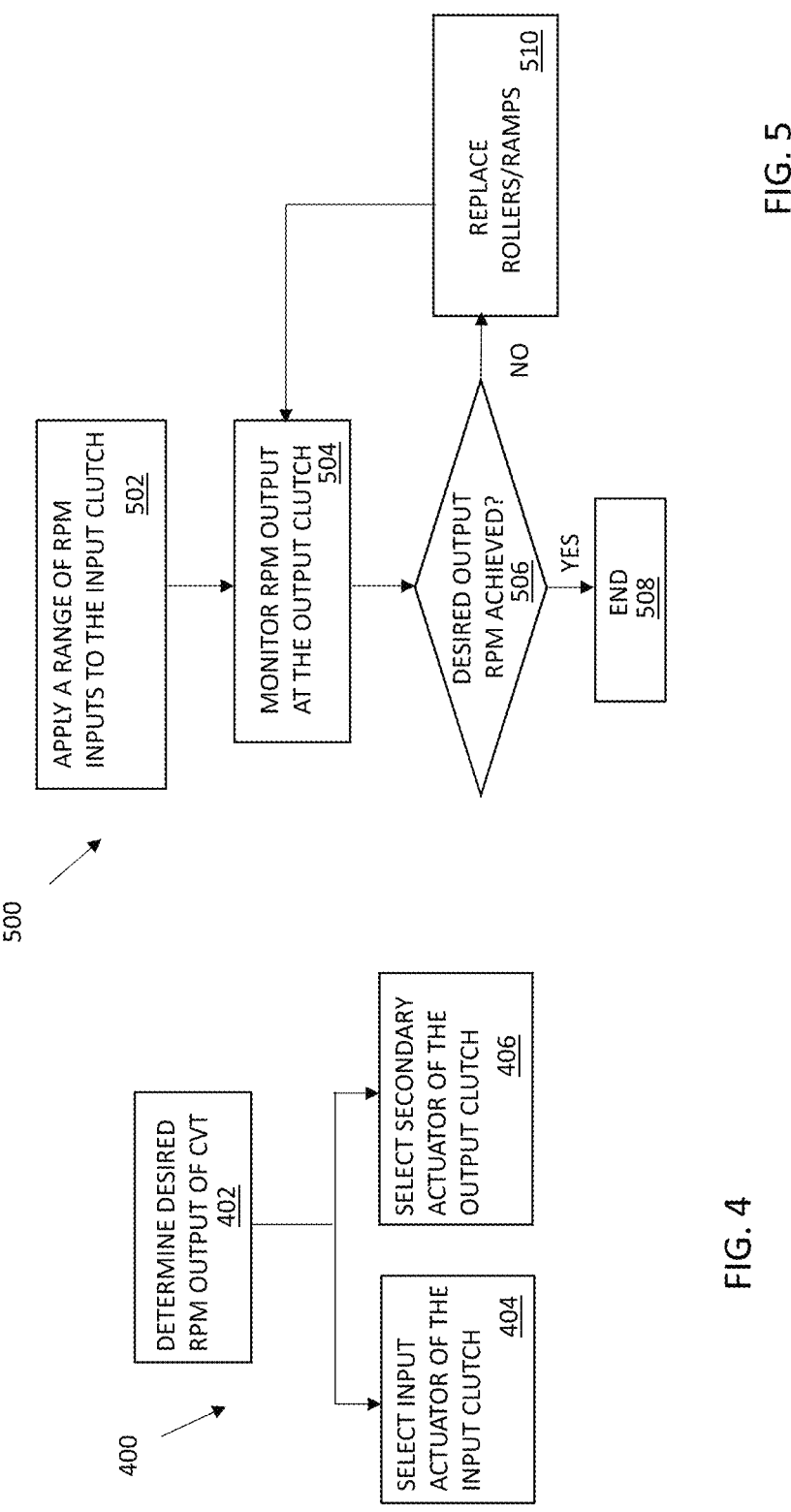
FIG. 4 is a flow diagram illustrating a method of forming a CVT providing a select RPM output according to an example aspect of the preset invention.
FIG. 5 is a flow diagram illustrating a method of calibrating a CVT to generate a desired RPM output.

Referring to FIG. 4, a method of forming a CVT with a constant RPM output is illustrated in flow diagram 400. Flow diagram 400 is provided as a sequence of blocks. The sequence may occur in a different order or even in parallel in other embodiments. Hence, embodiments are not limited to the sequence set out in FIG. 4.

Flow diagram 400 starts at block 402 where a desired RPM output from the output clutch 104 of the CVT 100 is determined. The selected RPM may be the RPM the rotational input operated device 110 is designed to operate at a peak efficiency or may be some other operating parameter of the rotational input operated device 110. The input actuator of the input clutch 102 is selected at block 404. The input actuator 226 may be a torque responsive assembly, an RPM responsive assembly or just a belt tensioner. The output actuator 207 is selected at box 406. The output actuator 207 is an RPM sensitive actuator assembly such as the roller 206 and ramp 208 assembly illustrated in FIG. 1B. Other RPM sensitive actuators may also be used. The output actuator 207 is selected so that a constant RPM output is delivered to the rotational input operated device 110 when the motor 302 is generating engine torque.

In one example embodiment that uses a roller and ramp configuration, the RPM output, set by the output clutch 104, is done by selecting a mass of the rollers 206 that results in a constant RPM output at a select RPM for an input range of at one of RPM inputs and torque inputs to the input clutch 102. An example method of calibrating the CVT 100 to output the desired RPM is provided in flow diagram 500 of FIG. 5. In this example, the determination of the needed mass of the rollers 206 to achieve a desired RPM output is done by testing the CVT 100. Flow diagram 500 is provided as a sequence of blocks. The sequence of the blocks may be in a different order or in parallel in other embodiments. Hence, embodiments are not limited to the sequence set out in FIG. 5.

The process of flow diagram 500 starts a block 502 where inputs, such as RPM inputs, within an input range are applied to the input clutch 102. In one example, the output clutch 104 may be calibrated separately from the input clutch 102 by supplying the inputs via an endlessly looped member (belt) that is subject to torque from another source. The RPM output of the output clutch 104 is monitored at block 504. At block 506 it is determined if a desired RPM output is achieved for the RPM inputs. If it is determined that the desired constant RPM output for the output clutch at the select RPM has been achieved at block 506, the calibration process ends at block 508. If, however, it is determined at block 506 the desired RPM output has not been achieved, the mass of the rollers 206 in the output clutch 104 is adjusted (switched out in an example) at block 510. The process then continues at block 504 until the desired continuous RPM output of the output clutch 104 at the select RPM is achieved through the range of RPM inputs. In another roller ramp arrangement embodiment, ramps 208 of the output clutch 104 are removable and different ramps with different slopes are used to adjust the RPM output of the output clutch 104 to achieve the desired constant RPM output of the output clutch 104 at the select RPM through the range of RPM inputs.

In embodiments if, for example, the desired constant RPM output is 3,500 RPM, the output of the output clutch 104 is monitored at block 504 while inputs (such as RPM inputs and torque inputs) across a range (an RPM range in an example) are applied to the input clutch 102 at block 502. For example, a range of RPM inputs may be between 700 RPMs (which might be encountered at a motor start up) to 5,550 RPMS or more (which may occur once the motor reaches normal operating conditions). If the monitored RPM output at the output clutch 104 is not at the constant desired RPM (3500 RPM in this example), replacement rollers of a different mass would replace the then current rollers 206 being used in the output clutch 104 as indicated at block 510. For example, if a 4,000 RPM was observed at the RPM output of the output clutch 104 while a desired 3,500 RPM is needed, in one example, a heavier set of replacement rollers (rollers with more mass) would be used to replace the then current rollers 206. This would result in a slower RPM being observed at output clutch 104. This process is repeated until the desired continuous RPM output at the output clutch 104 is observed. As discussed above, in one embodiment, ramps having different slopes may be switched instead of switching out the rollers with different masses to obtain the desired constant output RPM at the desired RPM. Moreover, in an example, rollers and ramps may both be switched out to obtain the desired constant RPM at the desired RPM.

Figure 6:
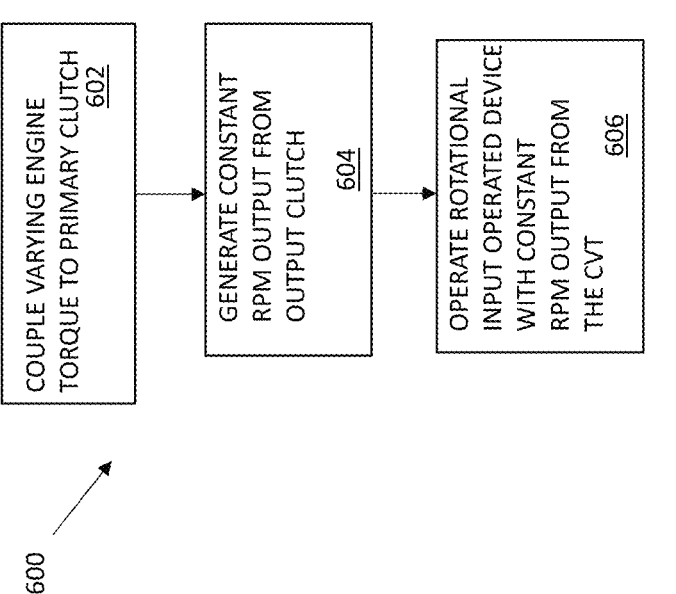
FIG. 6 is a flow diagram illustrating a method of operating a CVT providing a select RPM output according to an example aspect of the preset invention.

FIG. 6 illustrates a method of operating a CVT with a constant RPM output in flow diagram 600. Flow diagram 600 is provided as a sequence of blocks. The sequence may be in a different order or even in parallel in other embodiments. Hence, embodiments are not limited to the sequence set out in FIG. 6.

Flow diagram 600 starts at block 602 where a varying engine torque is coupled to the input clutch 102 of the CVT 100. A constant RPM output of a select RPM from the output clutch 104 is generated with the CVT 100 at block 604 in response to the varying engine torque. The constant RPM output is in operational communication with the input of the rotational input operated device 110. The rotational input operated device 110 is operated by the constant RPM output of the CVT 100 at block 606.

EXAMPLE EMBODIMENTS

Example 1 includes a CVT with a constant RPM output. The CVT includes an input clutch, an endlessly looped member and an output clutch. The input clutch is in operational communication with a motor. The output clutch is in operational communication with the input clutch via the endlessly looped member. The output clutch includes an output post, an output fixed sheave, an output movable sheave, and an output actuator. The output fixed sheave is axially fixed on the output post. The output movable sheave is axially slidable on the output post. The output actuator is configured to move the output movable sheave in relation to the output fixed sheave in response to a change in at least one of a torque input and RPM input that is delivered to the output clutch via the endless looped member to maintain a constant RPM output of the output clutch at a select RPM. The output clutch is configured to be coupled to a rotational input operating device that requires the select RPM for operation.

Example 2 includes the CVT with the constant RPM output of Example 1, wherein the input clutch further includes an input post, an input fixed sheave, an input movable sheave and an input actuator. The input post is in operational communication with the motor. The input fixed sheave is axially fixed on the input post. The input movable sheave is axially slidable on the input post and the input actuator is configured to axially move the input movable sheave on the input post relative to the input fixed sheave.

Example 3 includes the CVT with the constant RPM output of any of the Examples 1-2, wherein the input actuator is one of an RPM sensitive actuator assembly, a torque sensitive assembly and a belt tensioning assembly.

Example 4 includes the CVT with the constant RPM output of any of the Examples 1-3, wherein the output actuator of the output clutch further includes a plurality of ramps a roller for each ramp. Each ramp has a select slope and each roller is positioned to engage an associated ramp.

Example 5 includes the CVT with the constant RPM output of Example 4, wherein each roller has a select mass configured to maintain the constant RPM output of the output clutch at the select RPM in response to at least one of torque inputs within a torque input range and RPM inputs within an RPM input range delivered to the output clutch.

Example 6 includes the CVT with the constant RPM output of Example 4, wherein each ramp of the plurality of ramps is configured to be replaced.

Example 7 includes the CVT with the constant RPM output of Example 6, wherein the slope of each ramp is selected to maintain the constant RPM output of the output clutch at the select RPM in response to at least one of input torques within an input torque range and input RPMs within an input RPM range delivered to the output clutch.

Example 8 includes the CVT with the constant RPM output of Example 4, wherein the output clutch further includes a housing and a spider. Each ramp of the plurality of ramps is coupled to the housing. The spider is axially fixed on the output post. Each roller is couples to the spider.

Example 9 includes a power delivery system. The power delivery system includes a motor, a CVT, and a rotational input operated device. The motor is configured to generate engine torque. The CVT has a constant RPM output. The CVT includes an input clutch, and endlessly looped member and an output clutch. The input clutch is in operational communication with the motor to receive the engine torque generated by the motor. The output clutch is in operational communication with the input clutch via the endlessly looped member. The output clutch includes an output post, an output fixed sheave, an output movable sheave, and an output actuator. The output fixed sheave is axially fixed on the output post. The output movable sheave is axially slidable on the output post. The output actuator is configured to move the output movable sheave in relation to the fixed sheave on the output post in response to a change in at least one of an input torque and an input RPM that is delivered to the output clutch via the endless looped member to maintain a constant RPM output of the output clutch at a select output RPM. The rotational input operated device is in operational communication to receive the constant RPM output of the output clutch at the selected RPM.

Example 10 includes the power delivery system of Example 9, wherein the rotational input operated device includes one of a hydraulic pump, an electrical alternator, a wind turbine, and an energy storage flywheel.

Example 11 includes the power delivery system of any of the Examples 9-10, wherein the output actuator of the output clutch further includes a plurality of ramps and a roller for each ramp. Each ramp has a select slope and each roller is positioned to engage an associated ramp.

Example 12 includes the power delivery system of Example 11, wherein each roller has a select mass that is configured to maintain the constant RPM output of the output clutch at the select RPM for at least one of torque inputs within a torque input range and RPM inputs within an RPM input range delivered to the output clutch.

Example 13 include the power delivery system of Example 13, wherein each ramp of the plurality of ramps is configured to be replaced.

Example 14 includes the power delivery system of Example 13, wherein a slope of each ramp is selected to maintain the constant RPM output of the output clutch at the select RPM for at least one of torque inputs within a torque input range and RPM inputs within an RPM input range delivered to the output clutch.

Example 15 includes the power delivery system of any of the Examples 9-14, wherein the output clutch further includes a housing and a spider. Each ramp of the plurality of ramps is coupled to the housing. The spider is axially fixed on the output post. Each roller is couples to the spider.

Example 16 includes the power delivery system of any of the Examples 9-15, wherein the input clutch includes an input post, an input fixed sheave, an input movable sheave and an input actuator. The input post is in operational communication with the motor. The input fixed sheave is axially fixed on the input post. The input movable sheave is axially slidable on the input post. The input actuator is configured to axially move the input movable sheave on the input post in relation to the input fixed sheave.

Example 17 includes the power delivery system of any of the Examples 9-16, wherein the select RPM from the output clutch is an RPM that provides a peak operating efficiency of the rotational input operating device.

Example 18 includes a method of calibrating an output clutch of a CVT to produce a constant RPM output at a select RPM for inputs in an input range. The method including applying at least one of torque inputs and RPM inputs across the input range to an output clutch of the CVT, monitoring an RPM output of the output clutch throughout the input range of the at least one of the torque inputs and the RPM inputs; and when the monitored RPM output of the output clutch does not provide a desired constant RPM output at the select RPM throughout the input range, switching at least one of current rollers used to move an output movable sheave of the output clutch with replacement rollers having a different mass and current ramps with replacement ramps having different slopes until the desired constant RPM output at the select RPM is achieved.

Example 19 includes the method of Example 18, further including, when the monitored RPM output of the output clutch provides the select RPM throughout the input range of the inputs, ending the calibration.

Example 20 includes the method of any of the Examples 18-19, further including selecting a desired input actuator of an input clutch of the CVT; and electing a desired output actuator of the output clutch.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore. it is manifestly intended that this invention be limited only by the claims and the equivalents thereof.

The invention claimed is:

1. A continuously variable transmission (CVT) with a constant revolutions per minute (RPM) output comprising:
  an input clutch in operational communication with a motor, the input clutch including one of a torque sensitive actuator and an RPM sensitive actuator to set a gear ratio of the input clutch;
  an endlessly looped member; and
  an output clutch in operational communication with the input clutch via the endlessly looped member, the output clutch including,
    an output post,
    an output fixed sheave axially fixed on the output post,
    an output movable sheave axially slidable on the output post,
    an output actuator configured to move the output movable sheave in relation to the output fixed sheave in response to a change in at least one of a torque input and an RPM input that is delivered to the output clutch via the endless looped member to maintain a constant RPM output of the output clutch at a select RPM, the output clutch configured to be coupled to a rotational input operating device that requires the select RPM for operation;
  a plurality of ramps, each ramp having a select slope; and
  a roller for each ramp, each roller positioned to engage an associated ramp, wherein one of each roller having a select mass and the slope of each ramp selected to maintain the constant RPM output of the output clutch at the select RPM in response to at least one of torque inputs within a torque input range and RPM inputs within an RPM input range delivered to the output clutch.

2. The CVT with the constant RPM output of claim 1, wherein the input clutch further comprises:
  an input post in operational communication with the motor;
  an input fixed sheave axially fixed on the input post;
  an input movable sheave axially slidable on the input post; and
  an input actuator configured to axially move the input movable sheave on the input post relative to the input fixed sheave.

3. The CVT with the constant RPM output of claim 2, wherein the input actuator is one of an RPM sensitive actuator assembly, a torque sensitive assembly and a belt tensioning assembly.

4. The CVT with the constant RPM of claim 1, wherein each ramp of the plurality of ramps is configured to be replaced.

5. The CVT with the constant RPM of claim 1, wherein the output clutch further comprises:
  a housing, each ramp of the plurality of ramps coupled to the housing; and
  a spider axially fixed on the output post, each roller coupled to the spider.

6. A power delivery system comprising:
  a motor configured to generate engine torque;
  a continuously variable transmission (CVT) with a constant revolutions per minute (RPM) output including,
    an input clutch in operational communication with the motor to receive the engine torque generated by the motor, the input clutch including one of a torque sensitive actuator and an RPM sensitive actuator to set a gear ratio of the input clutch,
    an endlessly looped member, and
    an output clutch in operational communication with the input clutch via the endlessly looped member, the output clutch including, output post,
      an output fixed sheave axially fixed on the output post,
      an output movable sheave axially slidable on the output post, and
      an output actuator configured to move the output movable sheave in relation to the fixed sheave on the output post in response to a change in at least one of an input torque and an input RPM that is delivered to the output clutch via the endless looped member to maintain a constant RPM output of the output clutch at a select RPM,
    a plurality of ramps, each ramp having a select slope;
    a roller for each ramp, each roller positioned to engage an associated ramp, wherein one of each roller having a select mass and the slope of each ramp selected to maintain the constant RPM output of the output clutch at the select RPM in response to at least one of torque inputs within a torque input range and RPM inputs within an RPM input range delivered to the output clutch; and
    a rotational input operated device in operational communication to receive the constant RPM output of the output clutch at the select RPM.

7. The power delivery system of claim 6, wherein the rotational input operated device includes one of a hydraulic pump, an electrical alternator, a wind turbine, and an energy storage flywheel.

8. The power delivery system of claim 6, wherein each ramp of the plurality of ramps is configured to be replaced.

9. The power delivery system of claim 6, wherein the output clutch further comprises:
  a housing, each ramp of the plurality of ramps coupled to the housing; and
  a spider axially fixed on the output post, each roller coupled to the spider.

10. The power delivery system of claim 9, wherein the input clutch further comprises:
  an input post in operational communication with the motor;
  an input fixed sheave axially fixed on the input post;

an input movable sheave axially slidable on the input post; and an input actuator configured to axially move the input movable sheave on the input post in relation to the input fixed sheave.

11. The power delivery system of claim 6, wherein the select RPM from the output clutch is an RPM that provides a peak operating efficiency of the rotational input operating device.

12. A method of calibrating an output clutch of a continuously variable transmission (CVT) to produce a constant revolutions per minute (RPM) output at a select RPM for inputs in an input range, the method comprising:

applying at least one of torque inputs and RPM inputs across the input range to an output clutch of the CVT;

monitoring an RPM output of the output clutch throughout the input range of the at least one of the torque inputs and the RPM inputs; and when the monitored RPM output of the output clutch does not provide a desired constant RPM output at the select RPM throughout the input range, switching at least one of current rollers used to move an output movable sheave of the output clutch with replacement rollers having different masses and current ramps with replacement ramps having different slopes until the desired constant RPM output at the select RPM is achieved.

13. The method of claim 12, further comprising:

when the monitored RPM output of the output clutch provides the desired RPM output at the select RPM throughout the input range of the inputs, ending the calibration.

14. The method of claim 12, further comprising:

selecting a desired input actuator of an input clutch of the CVT; and selecting a desired output actuator of the output clutch.

\* \* \* \* \*